(12) United States Patent
Adams et al.

(10) Patent No.: US 8,104,327 B1
(45) Date of Patent: Jan. 31, 2012

(54) LEAK DETECTION METHOD FOR A PRIMARY CONTAINMENT SYSTEM

(75) Inventors: Joby L. Adams, Fort Collins, CO (US); Eric L. Hick, Fort Collins, CO (US)

(73) Assignee: C.G.R.S. Inc., Fort Collins, CO (US)

( * ) Notice: Subject to any disclaimer, the term of this patent is extended or adjusted under 35 U.S.C. 154(b) by 400 days.

(21) Appl. No.: 12/315,650

(22) Filed: Dec. 5, 2008

Related U.S. Application Data

(63) Continuation-in-part of application No. 11/535,910, filed on Sep. 27, 2006, now Pat. No. 7,461,541.

(51) Int. Cl.
G01M 3/02 (2006.01)
G01M 3/26 (2006.01)
G01M 3/32 (2006.01)

(52) U.S. Cl. ......... 73/40.5 R; 73/46; 73/49.2; 73/49.3; 73/49.8

(58) Field of Classification Search .............. 73/40–49.8
See application file for complete search history.

(56) References Cited

U.S. PATENT DOCUMENTS

| | | | | |
|---|---|---|---|---|
| 4,404,843 A * | 9/1983 | Johnson et al. | ................ | 73/49.2 |
| 4,450,711 A * | 5/1984 | Claude | ........................ | 73/40.5 R |
| 4,796,676 A * | 1/1989 | Hendershot et al. | ............. | 141/83 |
| 4,939,833 A * | 7/1990 | Thomas | ........................ | 220/565 |
| 5,184,504 A * | 2/1993 | Spring | ........................... | 73/49.2 |
| 5,265,465 A * | 11/1993 | Thomas | ........................ | 73/49.2 |
| 5,265,652 A * | 11/1993 | Brunella | ........................ | 141/59 |
| 5,343,191 A * | 8/1994 | McAtamney | ................. | 340/605 |
| 5,375,457 A * | 12/1994 | Trapp | ............................... | 73/40.7 |
| 5,589,631 A * | 12/1996 | Spring et al. | ................... | 73/49.2 |
| 5,591,898 A * | 1/1997 | Mayer | ............................... | 73/38 |
| 5,668,534 A * | 9/1997 | Haboian et al. | ............... | 340/605 |
| 6,029,505 A * | 2/2000 | Webb | .......................... | 73/40.5 R |
| 6,067,844 A * | 5/2000 | Westbrook et al. | ........ | 73/40.5 R |
| 6,116,817 A * | 9/2000 | Osborne | .................... | 405/154.1 |
| 6,935,161 B2 * | 8/2005 | Hutchinson | ................. | 73/40.5 R |
| 7,051,579 B2 * | 5/2006 | Kenney et al. | ................... | 73/49.2 |
| 7,127,937 B1 * | 10/2006 | Thyroff | ...................... | 73/40.5 R |
| 7,197,950 B2 * | 4/2007 | Maxwell et al. | ............. | 73/865.6 |
| 7,251,983 B2 * | 8/2007 | Hutchinson | ................ | 73/40.5 R |
| 7,353,691 B2 * | 4/2008 | Salem et al. | .................... | 73/40.7 |
| 7,788,967 B2 * | 9/2010 | Golding et al. | ............. | 73/40.5 A |
| 2003/0037596 A1 * | 2/2003 | Sorensen | ........................ | 73/40.7 |
| 2004/0045343 A1 * | 3/2004 | Hutchinson | ................ | 73/40.5 R |
| 2004/0234338 A1 * | 11/2004 | Monroe et al. | .................. | 405/54 |
| 2005/0166666 A1 * | 8/2005 | Tsukagoshi | .................... | 73/49.1 |

(Continued)

FOREIGN PATENT DOCUMENTS

EP 753729 A2 * 1/1997

*Primary Examiner* — David A. Rogers

(74) *Attorney, Agent, or Firm* — Edwin H. Crabtree; Ramon L. Pizarro

(57) ABSTRACT

A leak detection method for determining changes in helium concentration over time in an interstitial space between a primary vessel and a secondary vessel. The primary vessel is disposed inside a secondary vessel and charged with helium. An expected concentration of the helium in the interstitial space resulting from permeation of the primary vessel material is calculated and accounted for to determine a leak in the primary vessel. In another embodiment of the leak detection method, air flow is circulated in the interstitial space between the primary and second vessels. An abrupt change in measured concentrations can be used to determine the approximate location of the leak in the primary vessel.

8 Claims, 5 Drawing Sheets

U.S. PATENT DOCUMENTS

| | | | |
|---|---|---|---|
| 2006/0107731 A1* | 5/2006 | Thomas | 73/49.2 |
| 2007/0101803 A1* | 5/2007 | Tujii et al. | 73/38 |
| 2007/0119238 A1* | 5/2007 | Issel | 73/40.7 |
| 2008/0011056 A1* | 1/2008 | Spaolonzi et al. | 73/40 |
| 2008/0011057 A1* | 1/2008 | Spaolonzi et al. | 73/40 |

* cited by examiner

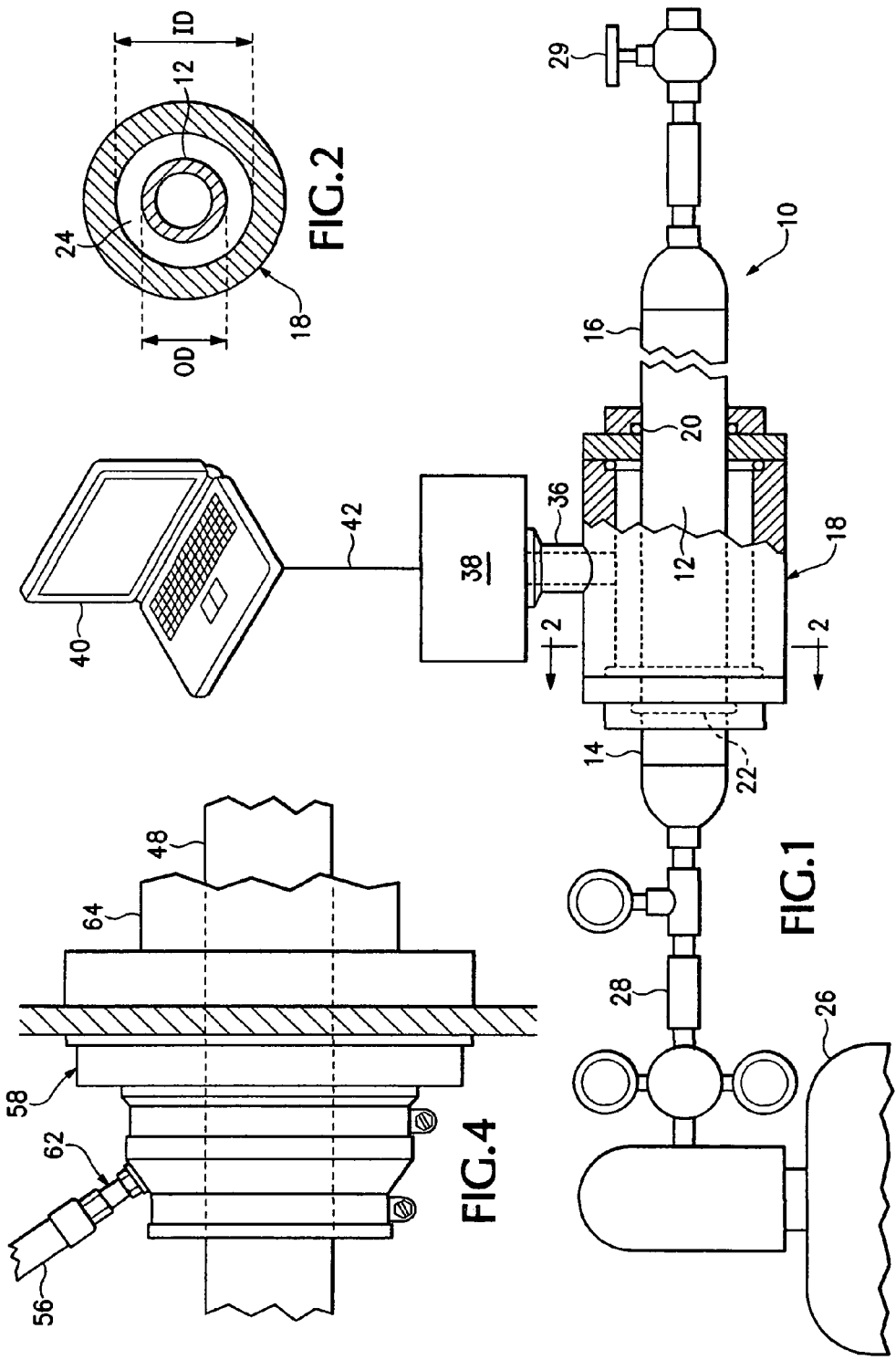

LEAK DETECTION METHOD FOR A PRIMARY CONTAINMENT SYSTEM

This patent application is a continuation-in-part patent application and claims the benefit of an earlier filed utility patent application Ser. No. 11/535,910, filed on Sep. 27, 2006, now U.S. Pat. No. 7,461,541, by the subject inventors, and having the same title as above.

FIELD OF THE INVENTION

The present invention relates to detecting leaks in a containment system of the type that has a primary container, such as a tank or a pipe, contained within a secondary container.

BACKGROUND

Systems for storing or transporting fluids that may damage the environment, such as caustic or volatile fluids, are often double-wall systems. These systems include a primary container that contains the fluid and a secondary container that contains the primary container. As a result, if the primary container leaks, the fluid is contained within the secondary container.

After such systems are installed, they are typically tested, which may be required by governmental regulations, to make sure that the primary container is functioning properly, i.e., not leaking. Sometimes these systems are buried underground. For example, petroleum dispensers are typically connected to underground storage tanks that contain the petroleum. The underground tanks as well as the pipe connecting the tanks to the dispensers are almost always primary containers that are surrounded and sealed within secondary containers. Even though the primary container is intended for liquids, the integrity of the system is typically determined by testing for vapor leaks.

Testing these, and other underground systems, after installation poses challenges because most of the containment system is buried and therefore not accessible except for portions that communicate with the surface, such as manways, risers and the like. Another challenge, regardless of the system location, is that the primary container may be made of a polymeric material that is somewhat permeable to any vapors it contains. In other words, there is a continuous, albeit small, transmission of vapor within the primary container into the interstitial space between the primary and secondary containers. This may need to be taken into account to accurately determine whether there is a vapor leak over and above that expected as a result of permeation.

Furthermore, when a primary system is first pressurized for testing, typically with a tracer gas, very little fluid permeates into the interstice between the primary and secondary containers. But permeation increases over time. When a primary vessel under test has been pressurized for a period before the test begins, concentrations of interstitial tracer gas are higher at the start of the test than if the vessel was pressurized immediately prior to the test start. These higher concentrations that result from permeation should be considered when determining the integrity of the primary vessel. Aside from the permeation issues, when a primary vessel is a pipe, especially a buried one, it would be desirable to approximate the location of any leak detected so that only a relatively small portion of the pipe system needed to be exposed by digging and then repaired.

BRIEF DESCRIPTION OF THE DRAWINGS

FIG. 1 is a somewhat schematic view of a test setup for determining helium permeation of a polymeric pipe.

FIG. 2 is an enlarged cross-sectional view taken along lines 2-2 in FIG. 1.

FIG. 4 is a partial enlarged view of a portion of the structure shown in FIG. 3.

DETAILED DESCRIPTION

Figure 3:
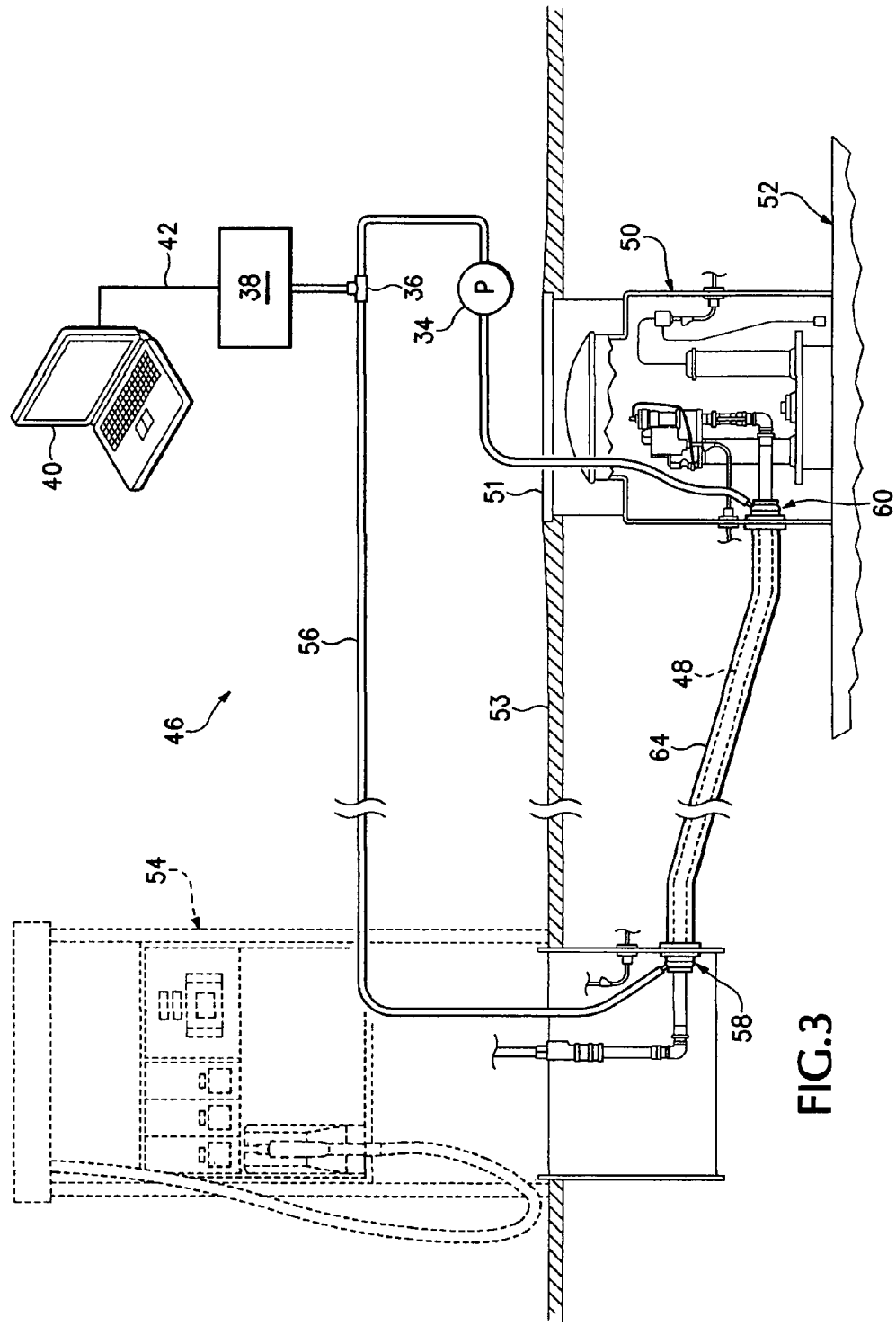
FIG. 3 is a somewhat schematic view of a test setup for determining the integrity of a buried pipe that runs between an underground storage tank and a petroleum dispenser.

Turning now to FIG. 1, indicated generally at 10 is a test setup for determining helium permeation of a polymeric material in the form of a pipe 12, having ends 14, 16. Because polymeric materials can be made from a variety of compositions, by different manufacturers, and with different wall thicknesses, it is desirable to use the exact material in pipe 12 that is to be tested in the field. A portion of pipe 12 is contained within a vacuum chamber 18. O-rings 20, 22 seal between the outer diameter of pipe 12 and the inner diameter of vacuum chamber 18. This creates an annular space 24 (also visible in FIG. 2) between the outer diameter of pipe 12 and the inner diameter of vacuum chamber 18.

End 14 of pipe 12 is connected to a helium tank 26 via a hose 28 and one or more valves, regulators, and gauges, as shown, for delivering helium from tank 26 to the interior of pipe 12. A valve 29 seals the interior of pipe 12 from the surrounding atmosphere when closed and provides open communication when opened. A T-joint 36 extends from vacuum chamber 18 and provides communication annular space 24 and a helium leak detector 38. The present implementation uses a Model 979 Series Helium Mass Spectrometer Leak Detector manufactured by Varian, although other types of helium sensors may be equally well used. Helium sensor 38 generates electrical signals that are proportional to helium concentration. These signals are provided to a computer 40, a laptop computer in the present embodiment, via a cable 42. In addition, helium sensor 38 includes a vacuum pump that, when operating, can create a powerful vacuum within annular space 24.

Before considering containment systems in the field, and how they are tested, a description of how setup 10 is used to determine permeation of polymeric material that is used in such containment systems is provided. After the polymeric material of interest, in the form of pipe 12, is configured as shown in setup 10, helium leak detector 38 is turned on to warm up. When the helium detector is ready, valve 29 is opened and helium tank 26 is placed in communication with hose 28 thus flushing out the interior of pipe 12. Valve 29 is then shut thereby pressurizing the interior of pipe 12 with helium at a positive pressure. Next the helium leak detector is activated to begin sensing the rate of change of helium in volume per unit time.

A program in computer 40 receives this data from helium sensor 38, which is in the form of periodic measurements indicating current concentrations of helium. These samples are shown on the permeation curve of FIG. 6 as diamonds. The samples are used in the best-fit curve equation at the top of FIG. 6 to create a curve 44 that substantially intersects each of the samples. When pipe 12 is first pressurized with helium there is no leaking. This is because permeation increases with time, as can be seen in the early stages of the curve. As can also be seen, the trace gas tends to saturate after the pipe has been pressurized for a while. In other words, there is only a gradual increase of helium flow through the polymeric material that results from permeation.

Typically a variety of pipes, like pipe 12, from different manufacturers and having different thicknesses are tested as described above. The test results produce different curves, like the curve of FIG. 6, for each pipe. Each curve is standardized for that material by correlating it with the surface area of the pipe 12, which produces a standard permeation curve for the material and thickness of pipe 12. These standardized permeation curves are stored on computer 40. When a particular polymeric material is encountered in a containment system to be tested, the corresponding standard permeation curve is used, in a manner that will be described, to test the system.

Turning now to FIG. 3, indicated generally at 46 is a test setup for determining the integrity of a buried containment system, specifically a pipe 48. As can be seen in FIG. 3, pipe 48 connects a manway 50, which is located on the top of a buried petroleum storage tank 52, with a petroleum dispenser 54. Manway 50 includes an access plate 51 that is substantially flush with the surface 53 of the ground in which tank 52 and pipe 48 are buried. Structure in setup 46 that is the same as structure in setup 10, in FIG. 1, retains the same numeral identifier in FIG. 3.

In setup 46, a hose 56 connects to fittings 58, 60 on either end of hose 48. Fitting 58 is conventional except for a quick-release connection 62, on fitting 58, which permits hose 56 to be connected to and disconnected from the fittings. FIG. 4 depicts an enlarged view of this arrangement. Pipe 48 is like pipe 12 in FIG. 1 in that it is made by the same manufacturer from the same material and has the same thickness. Pipe 48 is contained within a secondary pipe 64. Like the test setup of FIG. 1, which has annular space 24 (FIG. 2), there is an annular space between the outer diameter of pipe 48 and the inner diameter of pipe 64. Fittings 58, 60 permit fluid communication between the annular space and hose 56 on either end of the hose. As a result, as in test setup 10, when a pump or fan 34 is turned on, air circulates through hose 56 and along the length of the annular space.

Figure 5:
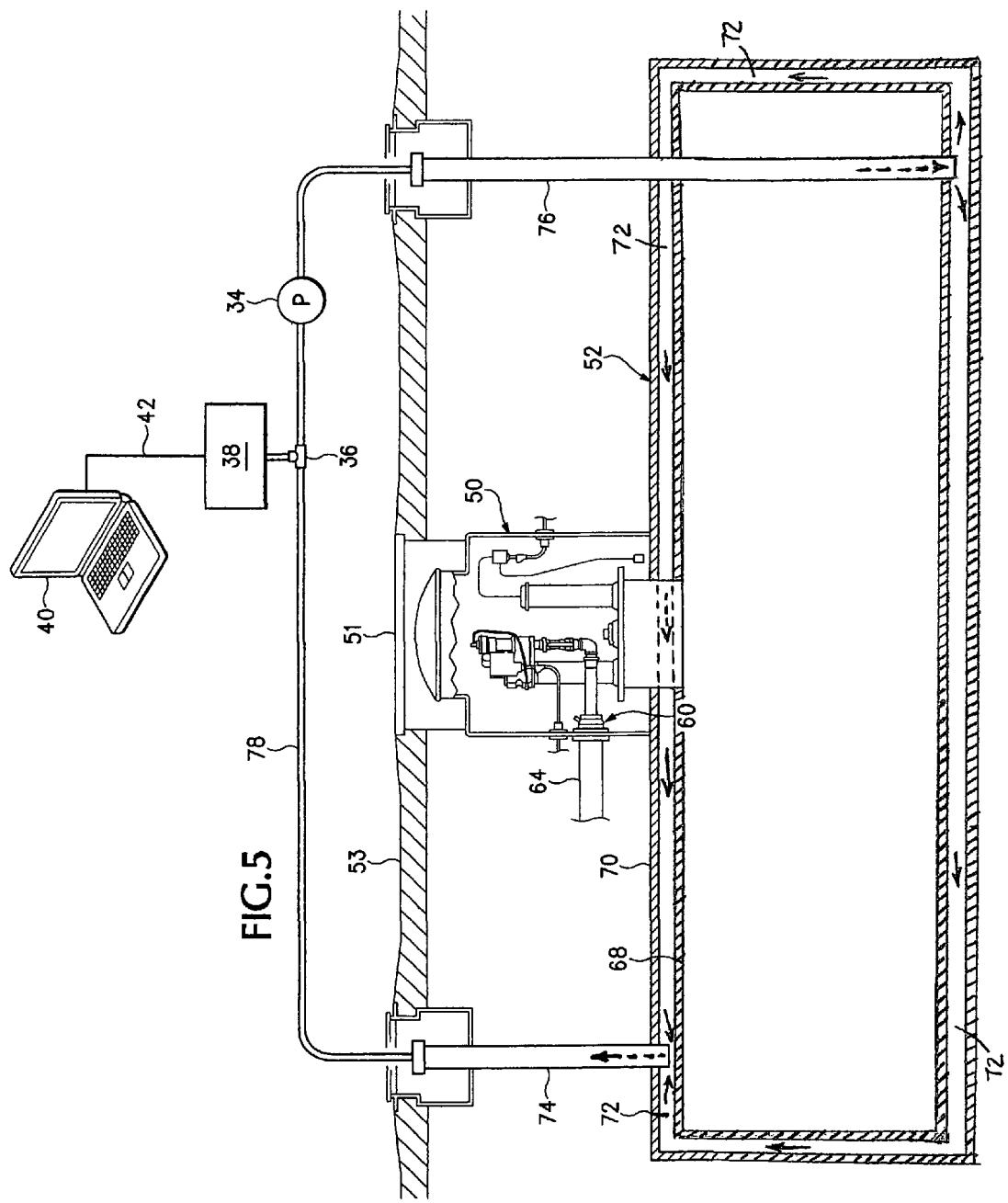
FIG. 5 is a somewhat schematic view of a test setup for determining the integrity of the underground storage tank in FIG. 2.

Before considering testing of the system of FIG. 3, description will first be made of another system test, namely testing the integrity of the underground tank 52 of FIG. 3, which is also shown in FIG. 5. Structure already described that is the same as structure in the setup of FIG. 5 retains the same numeral identifier. Tank 52 includes a primary vessel 68, which is made from a known polymeric material, and a secondary vessel 70. An interstitial space 72 is formed between the two vessels. A first riser 74 communicates with an upper portion of space 72, and a second riser 76 communicates with a portion of space 72, not visible, on the lower side of tank 52. A hose 78 connects risers 74, 76 via fan 34 and T-joint 36.

Considering first testing of the system of FIG. 5, primary vessel 68 is charged with helium from a tank (not shown) that is connected to the primary vessel 68 via connections in manway 50. After the tank is fully charged helium detector 38 is turned on. After the detector 38 warms up, fan 34 starts, with one end of hose 78 disconnected from its associated riser. This flushes whatever gasses may be in space 72 out into the atmosphere and essentially places the ambient atmospheric gasses into space 72. The hose is then reconnected and detector 38 begins making periodic measurements of helium concentration in hose 78 at its juncture with T-joint 38. It should be appreciated that the time between fully charging the vessel 68 and beginning of the test procedure, i.e., the start of concentration measurements, might be as little as a few minutes or it might be many weeks. The longer charging period may result from using helium for a preliminary pressure test that is conducted well before a final test, which is typically a government-sanctioned test. This procedure conserves helium and prevents additional helium transport if the initial charge is left in the vessel for the final test. But when the vessel has been charged for a long period before the final test, permeation of helium into space 72 could be a significant portion of the helium concentrations measured. This is true even though any helium in space 72 is flushed out as just described. It will be recalled that permeation increases over time. If the tank has been charged with helium for long enough, permeation of helium into space 72 will migrate into space 72 at the beginning of the test and will contribute to any helium measured, which may include helium contributed by one or more leaks or other defects in primary vessel 68 through which helium moves into space 72.

In the present embodiment, if there is a leak rate greater than 0.005 gallon per hour, the system fails and cannot be returned to or put into service. Although 0.005 gallon per hour is used as a test standard in this description, it should be appreciated that different jurisdictions use different standards. Other standards, which could also be tested for, might be imposed by a manufacturer or by the purchaser of the containment system. Knowing the volume of space 72, risers 74, 76 and hose 78, which together make up the volume of gas circulated by fan 34 and tested by detector 38, makes it possible to calculate the concentration of helium that equals the 0.005 gallon per hour leak rate. This value is calculated and stored on computer 40.

Figure 6:
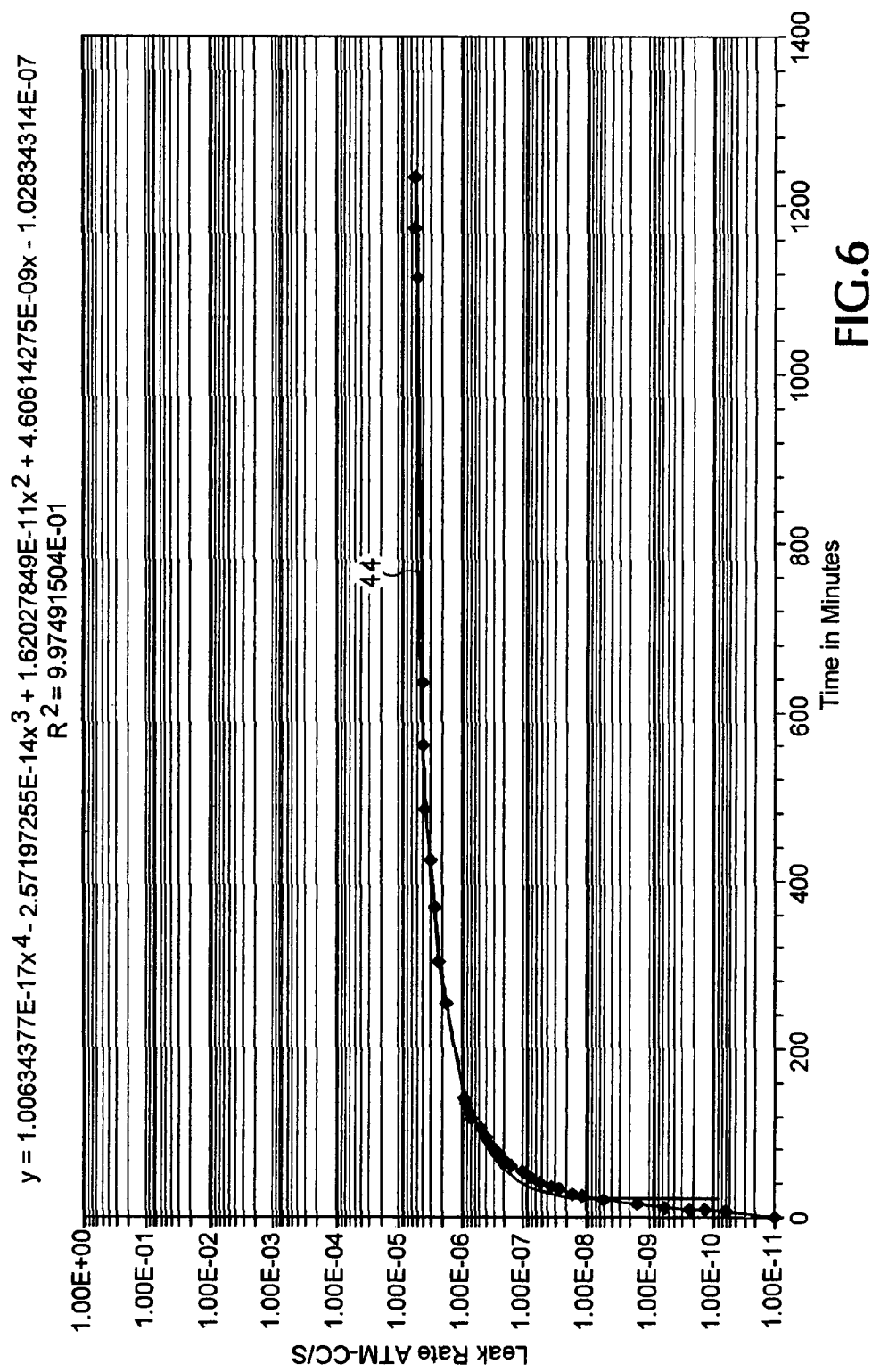
FIG. 6 is a permeation curve that resulted from the test depicted in FIG. 1.

If the tank has been charged long enough for the permeation through primary vessel 68 to be substantially steady state, i.e., after about 200-400 minutes in the curve of FIG. 6, consecutive samples taken by detetector 38 can be considered. If the samples are both below the calculated 0.005 gallon per hour benchmark, the system passes.

But if pair of measurements indicates a leak rate higher than the benchmark, that does not necessarily mean the system failed. It is possible that, due to permeation, concentrations early in the test period might exceed the 0.005 gallon per hour limit. As a result, the present method measures changes in concentrations over time, and compares these changes to changes in concentration over time that would be expected as a result of permeation.

By way of example, assume that the system test in FIG. 5 was initiated, i.e., measurement of helium concentrations began, 200 minutes after the tank was charged with helium, and end 400 minutes after charging. As can be seen on the FIG. 6 curve, permeation is fairly advanced at 200 minutes. The total expected flow for the 200 minute test period can be determined by integrating the standard curve between 200 and 400 minutes and scaling this value to FIG. 5 system using the exterior surface area of vessel 72, through which the permeation occurs, and the total volume where the helium concentration measurements are taken, namely the volume of space 72 plus the volumes of risers 74, 76 and hose 78.

The measured helium concentration, which includes permeation plus helium flow resulting from any leaks or other defects, for that time period is determined in a similar manner. Specifically, concentrations are measured between 200 and 400 minutes after charging with helium to create a curve of concentrations versus time. This curve is integrated between 200 and 400 minutes and the resulting value is scaled to the FIG. 5 system using the exterior surface area of vessel 72, through which the permeation occurs, and the total volume where the helium concentration measurements are taken, namely the volume of space 72 plus the volumes of risers 74, 76 and hose 78.

These calculations produce two numbers. First, an average concentration that would be expected for the system over the test time based on permeation alone. And second, an average concentration that results from measured helium that would include permeation and any other helium flow that might be occurring.

Comparing the actual rate of change with the expected rate of change resulting from permeation determines whether there are leaks and/or whether a particular standard is met.

Turning now to FIG. 3, testing here proceeds in a similar manner. Pipe 48 is charged with helium from a tank (not shown) by gaining access to an end of the pipe, either via manway 50 or dispenser 54. The annulus between pipes 48, 64 is flushed by disconnecting one end of hose 56 and running fan 34. Detector 38 begins measuring helium concentrations, and fan 34 is started. If there is a leak into the annulus anywhere along pipe 48, detetector 38 will measure a sharp increase in concentration once the initial slug of air propelled by the fan 34 pushes helium from the leak along the annulus, into hose 56 and to the detector.

Figure 7:
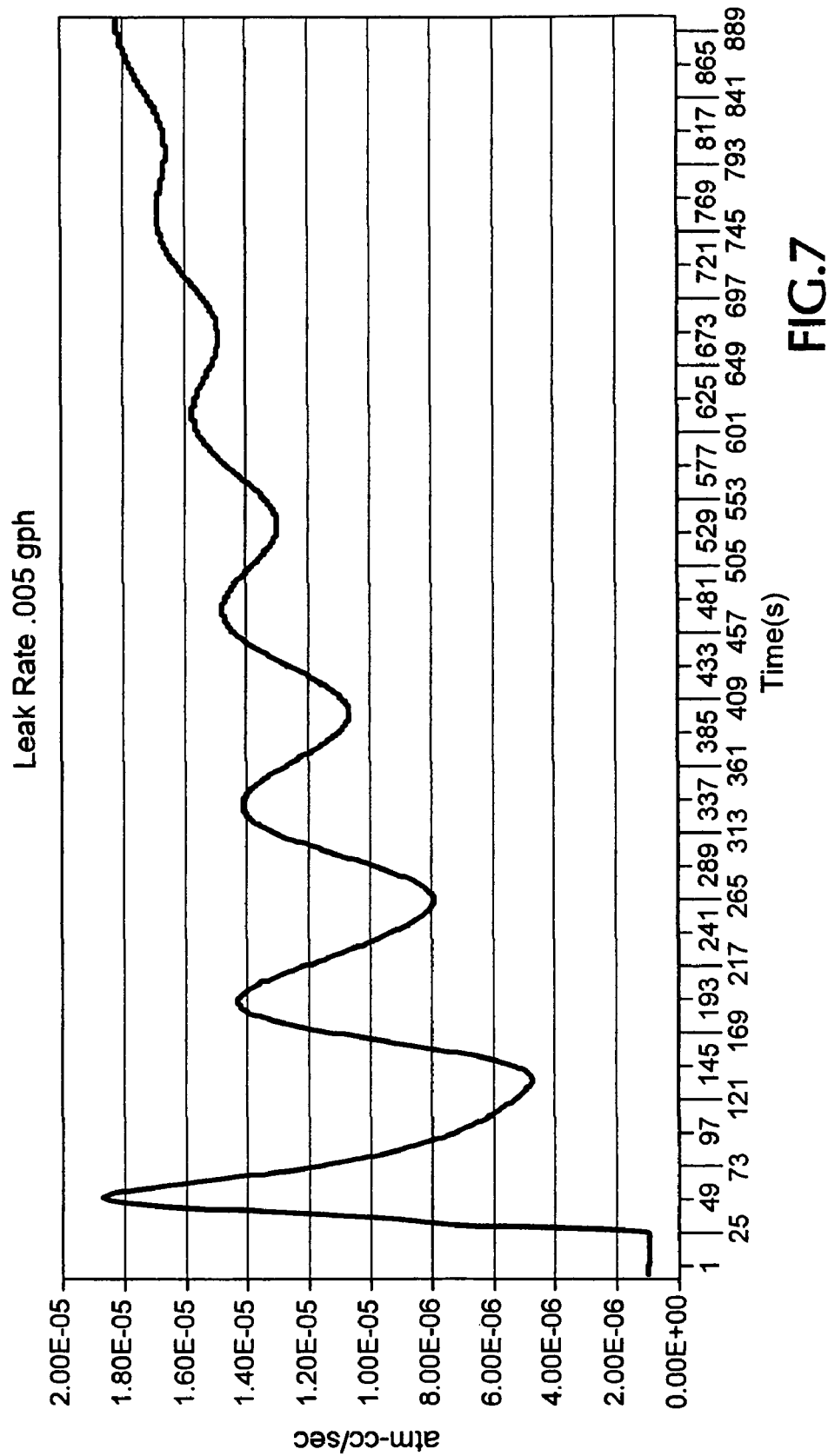
FIG. 7 is a test curve developed by the pipe testing setup in FIG. 3 indicating a leak in the pipe.

FIG. 7 depicts the peaks that occur as fan 34 circulates gas through the hose 56 and the annulus. Because there is a leak, the concentration continues to increase over time. After repeated circulations, the peaks are dampened. It is possible to use this data, along with the volume of the annulus and hose 56, the rate of air circulation by fan 34 and the time of pumping between the trough and crest of each wave cycle, to calculate an approximate leak location along the pipe 48. This can be accomplished by using the following equation:

Volume, $L^3$, in the pipe is divided by a length of the pipe 48, $L^1$, being tested, which will determine an area, $L^2$. The volume, $L^3$, is the volume primarily through the annulus between pipes 48, 64 and hose 56. Then by dividing air flow delivered by the fan 34, $L^3/t$, by the area, $L^2$, the result is air velocity, V (L/t). The air velocity L (L/t) is now multiplied by the time measured between the minimum and peak concentration, as shown in FIG. 7. This result will determine the distance or length from the detector 38, which is the location of the leak in the pipe 48.

The following is an example of the use of the above equation, using typical measurements, for locating the pipe leak:

The air volume is 25 cubic feet. The length of the pipe 48 to be tested is 100 feet. The time between the minimum and peak concentrations is 2 minutes. Thus by dividing 25 cubic feet by 100 feet, the area is 0.25 square feet to be tested. By dividing the 0.25 square feet area into the air flow of the fan 34, which is 2 cubic feet per minute, the velocity is 8 feet per minute. Then by multiplying the air velocity of 8 feet per minute times the 2 minute interval between minimum and peak concentrations (trough and crest), the result is 16 feet or the location of the leak is 16 feet from the detector 38.

With a leak like that shown in FIG. 7 it would be immediately apparent that the system exceeded the 0.005 gallon per hour limit. But for a buried pipe that does not immediately exhibit a leak, the standard permeation curve for pipe 48, which is one of the standard permeation curves stored on computer 40, is integrated over the test time as are the measured concentrations, and compared with one another as described above to determine whether there is leaking beyond normal permeation and whether it exceeds the 0.005 gallon per hour limit.

Having described and illustrated the principles of the invention in a preferred embodiment thereof, it should be apparent that the invention can be modified in arrangement and detail without departing from such principles. I claim all modifications and variation coming within the spirit and scope of the following claims.

The invention claimed is:

1. A method for detecting a potential leak in a primary vessel, the method also determining if there is a leak, a location of the leak in the primary vessel, the method using a gas leak detector with gas sensor and a computer, the computer attached to the gas leak detector, the primary vessel made from a known material, the method comprising:
   introducing a tracer gas under pressure inside a first test vessel, the first test vessel made of the same material as the primary vessel's known material, the first test vessel disposed inside a second test vessel with an annular space therebetween;
   sampling periodic measurements of the tracer gas permeating through the first test vessel into the annular space over a period of time and using air flow through the annular space to the gas leak detector;
   uploading the periodic measurements as electronic signals to the computer and creating a standard permeability curve using the periodic measurements, the standard permeability curve used in detecting for the potential leak in the primary vessel, the standard permeability curve having a test standard to determine if the primary vessel should be taken out of service for repair due to excessive leakage and exceeding the test standard;
   in the field, introducing the tracer gas under pressure inside the primary vessel, the primary vessel disposed inside a secondary vessel with an annular space therebetween;
   sampling periodic measurements of the tracer gas permeating through the primary vessel into the annular space using air flow through the annular space to the gas leak detector;
   uploading the periodic measurements as electronic signals to the computer and creating a primary vessel test curve using the periodic measurements;
   comparing the primary vessel test curve on the computer with the standard permeability curve on the computer to determine if the test curve exceeds the standard set by the permeability curve for leakage through the vessel's known material;
   testing further the primary vessel in the field if the test curve exceeds the test standard set by the standard permeability curve;
   measuring the time between a trough and a crest of a wave in a wave cycle on the test curve;
   determining the volume in the annular space between the primary and secondary vessels;
   determining the length of the annular space between the primary vessel and the secondary vessel;
   determining the air flow volume per time of the air flow through the annular space between the primary and secondary vessels;
   dividing the volume in the annular space by the length of the annular space to determine a square area under test,
   dividing the square area under test by the air flow volume to determine the velocity of the air flow in the annular space; and
   multiplying the air flow velocity times the time between the trough and the crest of the wave to determine the distance to the leak in the primary vessel from the gas leak detector.

2. The method of claim 1 wherein the primary vessel comprises a primary pipe and the secondary vessel is a secondary pipe surrounding the primary pipe, the primary and secondary pipe connected between a buried petroleum storage tank and a petroleum dispenser.

3. The method of claim 1 wherein the primary vessel and the secondary vessel makeup a buried petroleum storage tank, the tank connected to a petroleum dispenser.

4. The method of claim 1 wherein the standard permeability curve has a test standard of 0.005 gallons per hour.

5. The method of claim 1 wherein the sampling of periodic measurements of the tracer gas permeating through the first test vessel into the annular space occurs over a period of time of 200 to 400 minutes to reach a substantially steady state.

6. A method for detecting a potential leak in a primary vessel, the method also determining if there is a leak, a location of the leak in the primary vessel, the method using a gas leak detector with gas sensor and a computer, the computer attached to the gas leak detector, the primary vessel made from a known material, the method comprising:

introducing a tracer gas under pressure inside a first test vessel, the first test vessel made of the same material as the primary vessel's known material, the first test vessel disposed inside a second test vessel with an annular space therebetween;

sampling periodic measurements of the tracer gas permeating through the first test vessel into the annular space over a period of time in a range of 200 to 400 minutes using air flow through the annular space to the gas leak detector;

uploading the periodic measurements as electronic signals to the computer and creating a standard permeability curve using the periodic measurements, the standard permeability curve used in detecting for the potential leak in the primary vessel, the standard permeability curve having a test standard of 0.005 per hour to determine if the primary vessel should be taken out of service for repair due to excessive leakage and exceeding the test standard;

in the field, introducing the tracer gas under pressure inside the primary vessel, the primary vessel disposed inside a secondary vessel with an annular space therebetween;

sampling periodic measurements of the tracer gas permeating through the primary vessel into the annular space using air flow through the annular space to the gas leak detector;

uploading the periodic measurements as electronic signals to the computer and creating a primary vessel test curve using the periodic measurements;

comparing the primary vessel test curve on the computer with the standard permeability curve on the computer to determine if the test curve exceeds the standard set by the permeability curve for leakage through the vessel's known material;

testing further the primary vessel in the field if the test curve exceeds the test standard set by the standard permeability curve;

measuring the time between a trough and a crest of a wave in a wave cycle on the test curve;

determining the volume in the annular space between the primary and secondary vessels;

determining the length of the annular space between the primary vessel and the secondary vessel;

determining the air flow volume per time of the air flow through the annular space between the primary and secondary vessels;

dividing the volume in the annular space by the length of the annular space to determine a square area under test, dividing the square area under test by the air flow volume to determine the velocity of the air flow in the annular space; and multiplying the air flow velocity times the time between the trough and the crest of the wave to determine the distance to the leak in the primary vessel from the gas leak detector.

7. The method of claim 6 wherein the primary vessel comprises a primary pipe and the secondary vessel is a secondary pipe surrounding the primary pipe, the primary and secondary pipe connected between a buried petroleum storage tank and a petroleum dispenser.

8. The method of claim 6 wherein the primary vessel and the secondary vessel makeup a buried petroleum storage tank, the tank connected to a petroleum dispenser.

* * * * *